United States Patent [19]
Goutos

[11] 3,726,402
[45] Apr. 10, 1973

[54] APPARATUS FOR REMOVING PARTICULATE MATTER FROM A FILTER CHAMBER

[76] Inventor: George Goutos, 5534 W. 63rd Place, Chicago, Ill. 60638

[22] Filed: July 2, 1971

[21] Appl. No.: 159,198

[52] U.S. Cl. ................... 210/107, 210/138, 210/179
[51] Int. Cl. ............................................. B01d 19/42
[58] Field of Search ..................... 210/106, 107, 138, 210/145, 179, 39

[56] References Cited

UNITED STATES PATENTS 3,497,452  2/1970  Arvanitakis ........................... 210/39

*Primary Examiner*—John Adee
*Attorney*—Ronald L. Engel et al.

[57] ABSTRACT

Particulate matter may be effectively and automatically removed from the interior of a filter chamber by employing a vented auger having a hollow interior. The auger comprises inlet openings that provide fluid communication between the interior of the filter chamber and the interior of the auger and an outlet that provides fluid communication between the hollow interior and an auger outlet from the filter chamber. A recirculation pump is adapted to withdraw liquid from the auger outlet so as to cause liquid in the filter chamber to flow into the auger shaft, while the particulate matter collects around the outside surface of the auger shaft. Rotation of the auger moves the particulate matter surrounding the auger to a discharge opening in the filter chamber. Control means are provided to intermittently drive the auger and the recirculation pump at separate times, so that the recirculation pump will first draw particulate matter downwardly to the auger and then the auger will discharge the particulate matter surrounding the auger from the filter chamber.

20 Claims, 3 Drawing Figures

PATENTED APR 10 1973 3,726,402
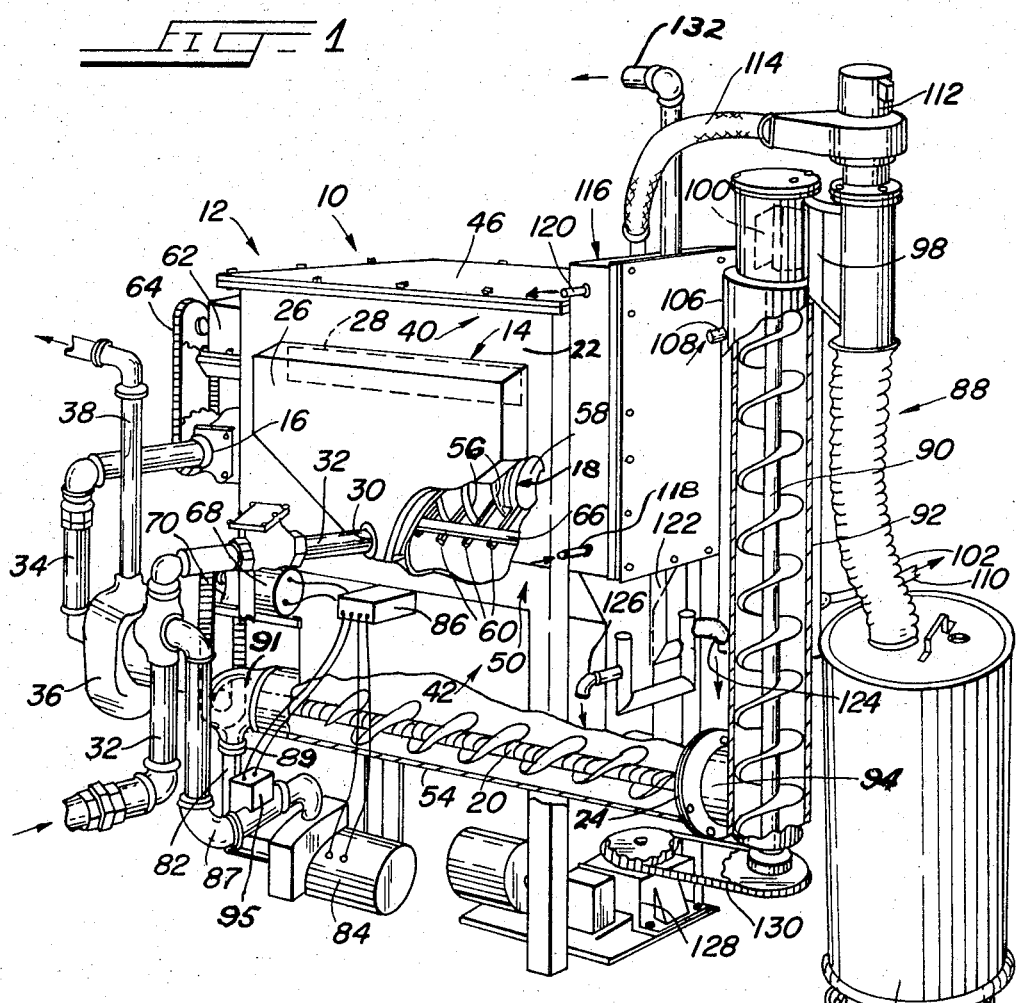
FIG. 1
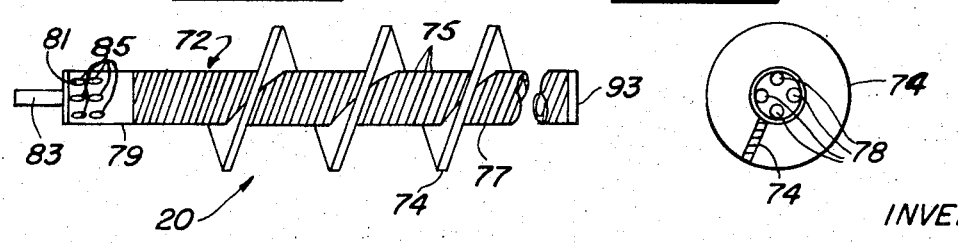
FIG. 2
FIG. 3
INVENTOR
GEORGE GOUTOS
BY John A. Waters

APPARATUS FOR REMOVING PARTICULATE MATTER FROM A FILTER CHAMBER

BACKGROUND OF THE INVENTION

1. Field of the Invention

The present invention relates to an apparatus for removing particulate matter from the interior of a filter chamber and, more particularly, this invention relates to a vented auger device for automatically removing particulate matter from a filter chamber.

2. Description of the Prior Art

Many commercial operations employ what are known as "self-cleaning" filter apparatus, such as the type shown in U.S. Pat. No. 3,497,452. Such filters generally comprise a filter for removing both solid and chemical impurities from an unclarified liquid, such as a dry cleaning solvent or the like, and a scraper mechanism to periodically remove accumulations of particulate matter (which comprise solid impurities as well as absorptive powder used for the filtration of chemical impurities) from the high pressure side of the filter. This dislodged particulate matter then settles or is drawn to the bottom of the filter chamber, where it accumulates as sludge.

One of the principal problems encountered in self-cleaning filters is the necessity to periodically remove accumulated particulate matter or sludge from the bottom of the filter chamber. Most filters employ only a clean-out door in the filter chamber for periodic manual removal of the sludge. This is a messy and time consuming procedure and involves substantial time delays, since the filtering apparatus must be shut down to clean out the filter chamber.

Some attempts also have been made to supplant the manual clean-out operation with an automatic sludge removal process employing a conventional auger mounted at the bottom of the filter chamber. However, heretofore such attempts have met with little success, because the heavy accumulations of particulate matter or sludge in the filter chamber tend to bridge across the walls of the filter chamber and thus fail to settle continuously into the path of the rotating auger. Consequently, the auger simply carves a channel out of the sludge and thereafter is ineffective in removing sludge.

In order to overcome these disadvantages with the prior art devices and provide an effective and service-free auger-driven sludge removal apparatus, the present invention was evolved.

SUMMARY OF THE INVENTION

In accordance with the present invention, apparatus for removing particulate matter from a liquid comprises a hollow auger rotatably mounted in a filter chamber having an inlet for unclarified liquid and particulate matter entrained therein, an auger outlet for clarified liquid, and a discharge opening for expelling particulate matter. The auger comprises inlet openings that provide fluid communication between the hollow interior of the auger and the interior of the filter chamber and an outlet that provides fluid communication between the interior of the auger and the auger outlet to the filter chamber. A recirculation pump is adapted to withdraw liquid from the auger outlet so as to cause liquid in the filter chamber to flow into the auger through the inlet openings, while the particulate matter collects around the outside surface of the auger shaft. Drive means are provided to rotate the auger and move the particulate matter to the discharge opening.

The discharge operation is substantially enhanced by a control device that intermittently actuates the recirculation pump and rotates the auger in sequential order until the sludge is removed from the filter chamber. Efficient removal of particulate matter may be accomplished by actuation of the pump for a period of about 2 minutes (or, alternatively, until the rate of flow of liquid from the auger outlet drops to about 3 gallons per minute or less) and thereafter actuating the drive means and deactuating the pump for 2 to 5 minutes, with a 3 minute interval being preferred.

The vented auger of the present invention comprises an auger blade mounted on an auger shaft, with the auger shaft comprising a helical member formed of rod material wound in a helix and mounted on spaced longitudinal support members. The auger is vented by means of a continuous helical slot formed by the adjacent coils of the helix. Preferably, the slot is about 1-3 millimeters wide, although a slot width of about 1-6 millimeters is satisfactory for operations in which coarse particulate matter is filtered. This prevents the particulate matter from passing into the hollow auger shaft along with the liquid, while at the same time providing a large enough opening to prevent clogging of the vents in the shaft. The helically vented shaft of the present invention provides a maximum opening space for the passage of liquid therethrough, while at the same time providing a structurally sound shaft for the mounting of the auger blade.

In operation, the present invention effectively eliminates bridging of particulate matter above the auger blade and causes a positive flow of particulate matter into contact with the auger for removal from the system. When the recirculation pump is actuated, liquid is drawn from the auger outlet of the filter chamber, and this in turn draws liquid in the filter chamber into the hollow interior of the auger. This flow of liquid, together with the accompanying pressure drop that is caused thereby in the area of the auger shaft, breaks up any particulate matter bridging across the walls of the filter chamber and draws the particulate matter into contact with the auger itself for removal from the filter chamber.

After the recirculation pump has been operated long enough to draw a sufficient quantity of particulate matter into contact with the auger, the pump is automatically deactuated by the control device (i.e., either a timing device or a flow responsive device) and the drive means is actuated to rotate the auger and discharge the particulate matter surrounding the auger from the discharge opening. This cycle is repeated until all of the sludge is discharged from the filter chamber.

BRIEF DESCRIPTION OF THE DRAWINGS

FIG. 1 is a perspective view of a filter apparatus employing the vented auger sludge removal device of the present invention, shown partially broken away.

FIG. 2 is a side view of the vented auger of the present invention.

FIG. 3 is a cross sectional end view of the vented auger of the present invention.

DETAILED DESCRIPTION OF THE PREFERRED EMBODIMENT

Referring now to the drawings, a filter apparatus 10 constructed in accordance with the present invention is shown in FIG. 1. Filter apparatus 10 comprises filter chamber 12 having a baffled inlet 14 for admitting unclarified liquid and a filter outlet 16 for conveying clarified liquid from the filter.

The interior portion of filter chamber 12 is provided with a self-cleaning filter 18 rotatably mounted in the upper portion thereof, with the filter 18 having an outlet thereto in fluid communication with filter outlet 16 in the filter chamber. At the bottom of filter chamber 12, a vented auger 20 for discharging particulate matter or sludge from the filter chamber is mounted in a horizontal position, with the right end of auger 20 (FIG. 1 orientation) terminating adjacent a discharge opening 24 in the filter chamber.

The baffled inlet 14 to filter chamber 12 comprises a hollow baffle member 26 mounted on the side wall 22 of filter chamber 12, such that the uppermost portion of the baffle member is in fluid communication with a slot 28 formed in side wall 22. An opening 30 in the bottom of baffle member 26 is connected to a conduit 32 which leads to a source of unclarified liquid. Such a source might be a primary filter in a filtering operation wherein both a primary filter and a sludge filter are employed (e.g., in most dry cleaning applications). Alternatively, in some systems, the inlet to the filter could be connected directly to a source of unclarified liquid, without employing any primary filter. Such an operation might be for oil filtration or water pollution applications, or it might be for the filtration of water in a car wash or any other such application wherein the filter is required to remove a relatively large quantity of particulate matter from the liquid.

Filter outlet 16 of filter chamber 12 is connected to a conduit 34, which leads to an outlet pump 36. Pump 36 pumps clarified liquid by means of conduit 38 back to the apparatus from which the unclarified liquid was drawn.

Filter chamber 12 comprises an upper portion 40 in which the self-cleaning filter is mounted and a lower portion 42 of substantially narrower cross section, wherein the vented auger sludge removal device of the present invention is mounted. The upper portion 40 of the filter chamber is enclosed by a top 46, which may be removed to permit access to the filter chamber. At the bottom of upper portion 40 the filter chamber is narrowed substantially by means of an inwardly tapered member 50. Tapered member 50 is in turn connected to lower portion 42 of the filter chamber.

Lower portion 42 depends vertically downwardly into contact with a cylindrical auger channel 54 at the bottom of the filter chamber. Auger channel 54 runs in a horizontal direction longitudinally along the bottom of the filter chamber and extends from the left-hand end of the filter chamber (FIG. 1 orientation) to the right-hand end thereof, terminating adjacent discharge opening 24.

Self-cleaning filter 18 comprises a series of parallel disc filters 56 mounted in axial alignment along a perforated hollow shaft 58. An outlet for clarified liquid at one end of hollow shaft 58 is connected in fluid communication with filter outlet 16.

Unclarified liquid introduced into the filter chamber through inlet 14 enters the individual disc filters through the high pressure sides thereof and passes through the disc filters into the open interior of shaft 58, leaving the particulate matter entrained therein on the high pressure sides of the disc filters. The liquid clarified by the filter then passes through outlet 16 and is conveyed by pump 36 back to the operation from which the liquid was drawn.

In order to remove particulate matter which accumulates on the disc filters, a series of wiper or scraper elements 60 are positioned adjacent the high pressure sides of each respective disc filter, and the shaft on which the disc filters are mounted is rotated relative to these wiper elements by means of a drive motor 62. Drive motor 62 is mounted on the outside of the filter chamber and is drivingly connected to the perforated shaft on which the filters are mounted by means of a drive chain 64. Wiper elements 60 are prevented from rotating along with the filter discs by a stop bar 66 securely fastened to the filter chamber.

After the particulate matter is removed from the filter, it settles downwardly into the lower portion 42 of the filter chamber, at which time it is removed from the system by means of the vented auger sludge removal apparatus of the present invention.

In accordance with the present invention, the sludge removal apparatus comprises a hollow vented auger 20, which is rotatably mounted in auger channel 54, so that it may be rotated by means of an auger drive motor 68 through a drive chain 70. The right-hand end (FIG. 1 orientation) of auger 20 terminates adjacent discharge opening 24 in filter chamber 12, so that rotation of auger 20 in auger chamber 54 will cause any sludge deposited in the path of the auger to be transported to the discharge opening and expelled from the filter chamber.

As shown in greater detail in FIGS. 2 and 3, auger 20 comprises a helical auger blade 74 mounted on a hollow auger shaft 72. Auger shaft 72 is provided with a plurality of inlet openings 75 formed in the outer wall thereof, so that liquid surrounding the auger shaft may pass through the walls of the shaft into the interior thereof.

Auger shaft 72 comprises a helical member 77 formed of rod material wound in a helix and mounted on spaced longitudinal support members 78. Preferably, the rod material from which helical member 77 is formed has a cross sectional area that takes the form of a truncated isosceles triangle, with the base of the triangle serving as the outer surface of the helix. This helical member is commercially available from Universal Oil Products Company, Des Plaines, Ill. and is shown and described in Likness U.S. Pat. No. 3,494,049, which issued to Universal Oil Products Co. as assignee.

In addition to helical member 77, the auger shaft of the present invention also comprises a hollow tubular member 79, approximately the same diameter as helical member 77, which is connected to the left-hand end of helical member 77 (FIG. 1 and 2 orientations) in coaxial alignment therewith. Tubular member 79 is provided with an end cap 81 at the outer end thereof, and a coaxial drive shaft 83 of substantially smaller diameter extends outwardly therefrom. The right-hand end of auger 20 is closed by means of an end cap 93.

A series of spaced openings 85 formed around the perifery of tubular member 79 adjacent the outer end thereof comprise the outlet from the hollow interior of the auger shaft.

As mounted for operation in the filter chamber, auger 20 lies in auger channel 54 with its right end terminating adjacent discharge opening 24. As it extends to the left, the entire helical member 77 lies within the filter chamber, while the left-hand end of tubular member 79 extends through the wall of the filter chamber and is enclosed by a rotary coupling 91 mounted on the outside of the filter chamber. Drive shaft 83 extends through the rotary coupling and is drivingly connected to drive motor 68 by means of drive chain 70.

An auger outlet 89 is formed in rotary coupling 91 and this outlet is connected to a recirculation conduit 82 leading to the inlet of a recirculation pump 84. The outlet of pump 84 is in turn connected to a conduit 87 which joins conduit 32 leading to inlet 14 of the filter chamber. Thus, whenever pump 84 is actuated, liquid in the filter chamber is drawn into the interior of the auger through the inlet openings in helical member 77, and this liquid is recirculated back to the filter chamber through outlet openings 85 in the auger, outlet 89 in rotary coupling 91, conduit 82, pump 84, conduit 87, and inlet conduit 32. As an alternative arrangement, it would be possible to have the liquid pumped back to the system from which it was received or to some suitable reservoir rather than having the liquid recirculated back to the filter chamber in a closed loop, but the recirculation aspect of the present invention provides advantageous additional filtration steps before returning the clarified liquid to the system.

In accordance with the present invention, sludge or particulate matter is removed from the filter chamber by the sequential and repeated actuation of the recirculation pump 84 and auger drive motor 68. This sequential operation is accomplished automatically by means of a control device 86.

Control device 86 regulates the actuation of recirculation pump 84 either by an automatic timing device (which actuates the pump for a predetermined period of time) or by a liquid flow responsive device 95 inserted in outlet conduit 87 leading from pump 84. With the latter device, after the pump has been in operation for a sufficient period of time for the particulate matter in the filter chamber to collect about the auger and thereby cause a substantial reduction in the amount of liquid flowing into the interior of the auger, the pump is automatically deactuated and the auger drive is automatically actuated. Preferably, this flow responsive device is adjusted to deactuate the pump and actuate the auger drive motor whenever the liquid flow rate drops to about 3 gallons per minute or less, although different pump cut-off rates might be advantageously employed for particular applications.

When the pump is actuated by a timing device, as opposed to a flow responsive device, effective and efficient removal of particulate matter is achieved in accordance with the present invention by operating the pump for about 2 minutes although some variation at this time may be required for some applications, depending upon the quantity and density of the particulate matter involved.

Upon deactuation of the pump the control device automatically actuates the auger drive motor and causes the auger to rotate for a predetermined period of time, which may, depending upon the quantity and quality of the particulate matter involved, range anywhere from 2 to 5 minutes, with some applications requiring longer or shorter durations of time. When a timing device is employed to actuate the pump, a particularly effective timing cycle is 2 minutes of pump operation followed by operation of the auger drive motor for 3 minutes.

The purpose of the staggered actuation of the recirculation and drive apparatus is as follows. After the pump has been in operation for a certain period of time, the particulate matter in the filter chamber collecting around the auger shaft causes an impairment in the liquid flow through the openings therein. At this time, the pump is automatically deactuated and the auger drive motor is actuated until the particulate matter surrounding the auger is expelled from the filter chamber. This cycle is then repeated until the particulate matter is removed from the filter chamber.

One reason for deactuating the pump while the auger is in operation is that while the pump is in operation the sludge tends to cling to the vertical auger shaft with greater force than it would exert if the recirculation apparatus were deactuated, thereby impairing to some extent the efficiency of the transporting function of the auger device. In accordance with the present invention, for most purposes, the 2 minute pumping and 3 minute drive cycle as above described is sufficient to insure the continuous movement of sludge into the path of the auger, while at the same time optimizing the rate of removal of sludge from the filter chamber.

In addition to the above-described vented auger sludge removal device, the preferred embodiment of the present invention also employs a sludge conveyance apparatus 88 for conveying sludge away from discharge opening 24. In the preferred embodiment of the present invention, conveyance apparatus 88 comprises a vertical auger 90 mounted in a vertically oriented cylindrical channel 92, which has an opening 94 at the lower end thereof in fluid communication with discharge opening 24 in the filter chamber. Channel 92 extends upwardly to a discharge opening 98 at the upper end thereof, which is above the liquid level in the filter chamber. In operation, conveyance apparatus lifts sludge expelled from the discharge opening inwardly above the liquid level in the filter chamber (thereby permitting the liquid to drain from the sludge) and discharges the sludge out of discharge opening 98 by means of a rotating paddle 100 mounted on the top of the auger. After the sludge passes out of opening 98, it falls through a waste chute 102 into a waste container 104, which may be emptied periodically without disturbing the operation of the filter.

In order to further enhance the removal of volatile liquids from sludge, a steam distillation jacket 106 may be employed in connection with conveyance apparatus 88. Steam distillation jacket 106 is formed around auger channel 92 and has a steam inlet 108 at the upper end thereof and a steam outlet 110 at the lower end thereof. Hot steam injected into the steam jacket heats and vaporizes the liquid in auger channel 92, and the vaporized liquid passes upwardly through the top of the auger channel and out through discharge outlet 98. The vaporized liquid is then drawn away from the sludge by means of a blower 112 mounted on the top of waste chute 102 and is forced through conduit 114 into a condensing element 116.

Condensing element 116 is provided with a water inlet 118 and a water outlet 120 for condensing the vaporized liquid. The condensed liquid passes out through the bottom of the condenser through a liquid separator 122, which separates the liquid from any water contained therein. The liquid emanates from outlet 124 to be returned to the system and water is passed from outlet 126. Any uncondensed vapors are conveyed away from condensing element 116 by vent conduit 132.

The vertical auger 90 is driven rotatively by means of drive motor 128, which rotates the auger through chain drive 130.

It should be understood that the embodiment described herein is merely exemplary of the preferred practice of the present invention and that various changes, modifications, and variations may be made in the arrangements, details of construction, and operations of the elements disclosed herein, without departing from the spirit and scope of the present invention.

I claim:

1. Apparatus for removing particulate matter from a liquid comprising:
   a filter chamber having an inlet for unclarified liquid and particulate matter entrained therein, an auger outlet for clarified liquid, and a discharge opening for expelling particulate matter from the filter chamber;
   auger means having a hollow interior rotatably mounted in the filter chamber, said auger means being adapted to transport accumulated particulate matter from the interior of the filter chamber and expel the particulate matter from the filter chamber through the discharge opening therein;
   vent means adapted to provide fluid communication between the interior of the filter chamber and the interior of the auger means;
   outlet means adapted to provide fluid communication between the interior of the auger means and the auger outlet in the filter chamber;
   recirculation means adapted to withdraw liquid from the filter chamber through the auger outlet; and
   drive means adapted to rotate the auger means,
   whereby operation of the recirculation means causes liquid in the filter chamber to flow into the interior of the auger means and particulate matter entrained in the liquid to collect on the outside of the auger means, operation of the drive means causing the auger to transport the particulate matter surrounding the auger means to the discharge opening.

2. Apparatus as claimed in claim 1 wherein the vent means comprise inlet openings in the auger means that are sufficiently small to substantially prevent the passage of the particulate matter therethrough.

3. Apparatus as claimed in claim 2 wherein the inlet openings in the auger means are about 1–6 millimeters wide.

4. Apparatus as claimed in claim 3 wherein the inlet openings in the auger means are about 1–3 millimeters wide.

5. Apparatus as claimed in claim 4 wherein the inlet openings in the auger means are about 2 millimeters wide.

6. Apparatus as claimed in claim 2 wherein the auger means comprises an auger blade mounted on an auger shaft, said auger shaft comprising a helical member formed of rod material wound in a helix, with the inlet openings comprising a helical slot formed between adjacent coils of the helix.

7. Apparatus as claimed in claim 6 wherein:
   the auger means further comprises a plurality of longitudinal support members on which the helical member is mounted; and
   the helical slot is about 1–3 millimeters wide.

8. Apparatus as claimed in claim 7 wherein the cross section of the rod material from which the helical member is formed comprises a truncated isosceles triangle, with the base of the triangle serving as the outer surface of the helix.

9. Apparatus as claimed in claim 1 and further comprising control means adapted to operate the recirculation means and drive means in sequential order, wherein the control means automatically actuates the recirculation means and deactivates the drive means and then actuates the drive means and deactivates the recirculation means, whereby actuation of the recirculation means draws particulate matter into the path of the auger so it may be removed from the system, and actuation of the drive means causes the auger to move the particulate matter to the discharge opening in the filter chamber.

10. Apparatus as claimed in claim 9 wherein the control means actuates the recirculation means for a period of time sufficient to break up bridging of particulate matter in the filter chamber and cause a substantial quantity of particulate matter to collect around the auger means, and the control means thereafter actuates the drive means for a period of time sufficient to expel the particulate matter surrounding the auger from the filter chamber, with the recirculation and drive means actuation steps being repeated in sequential order a sufficient number of times to effect the substantial removal of particulate matter from the filter chamber.

11. Apparatus as claimed in claim 10 wherein the control means automatically actuates the recirculation means and drive means sequentially for periods of about 2 minutes and 3 minutes, respectively.

12. Apparatus as claimed in claim 9 wherein the control means comprises a flow responsive means associated with the auger outlet in the filter chamber, said flow responsive means being adapted to deactuate the recirculation means when the rate of flow of liquid from the auger outlet drops to a predetermined rate, said control means being adapted to automatically actuate the drive means for a predetermined period of time when the recirculation means becomes deactuated.

13. Apparatus as claimed in claim 12 wherein:
   the flow responsive means is adapted to deactuate the recirculation means whenever the rate of flow of liquid from the auger outlet drops to about 3 gallons per minute or less; and
   the control means is adapted to actuate the drive means for about 2–5 minutes after deactuation of the recirculation means.

14. Apparatus as claimed in claim 1 and further comprising conveyance means adapted to convey particulate matter expelled from the discharge opening away from the filter apparatus.

15. Apparatus as claimed in claim 14 wherein the conveyance means comprises vertical auger means adapted to lift the particulate matter to a point above the liquid level in the filter chamber and thereafter discharge the particulate matter into a waste container.

16. Apparatus as claimed in claim 15 and further comprising steam distillation means associated with the vertical auger means so as to distill liquid from the sludge as it is being conveyed upwardly in the vertical auger.

17. Apparatus as claimed in claim 16 and further comprising condenser means to condense the liquid vaporized by the steam distillation means.

18. A filter for clarifying liquids comprising:
a filter chamber having a bottom therein that forms a transverse auger channel, said filter chamber having an inlet thereto for unclarified liquids, a filter outlet and an auger outlet thereto for clarified liquids, and a discharge opening therein for the removal of sludge therefrom;
a self-cleaning filter rotatably mounted in the filter chamber, said filter having a high pressure side thereof in fluid communication with the interior of the filter chamber and a low pressure side in fluid communication with the filter outlet to the filter chamber;
scraper means adapted to remove particulate matter from the high pressure side of the filter, thereby permitting the particulate matter to settle to the bottom of the filter chamber as sludge;
auger means having a hollow interior positioned in the auger channel in the bottom of the filter chamber, said auger means having one end adjacent the discharge opening in the filter chamber and being adapted to move sludge in the filter chamber outwardly through the discharge opening therein, said auger means further having inlet openings therein which permit liquid in the filter chamber to flow from the filter chamber through the outer walls of the auger means and into the hollow interior thereof, said auger means further having an outlet thereto in fluid communication with the auger outlet in the filter chamber;
recirculation pump means adapted to draw liquid from the auger outlet of the filter chamber and return the liquid to the inlet of the filter chamber;
drive means adapted to rotate the auger means in the filter chamber so as to move sludge in the filter chamber toward and through the discharge opening therein; and
control means adapted to effect sludge removal from the filter chamber by sequentially actuating the pump means and auger means for intermittant periods of time until the sludge is effectively removed from the filter chamber.

19. Apparatus as claimed in claim 18 wherein the auger means comprises an auger blade mounted on an auger shaft, with the auger shaft comprising:
a hollow tube-shaped helical member having a helical slot formed therein, the width of said slot being about 1–6 millimeters;
a hollow tubular member with a diameter substantially the same as the diameter of the helical member, said tubular member being in coaxial alignment with and being attached to one end of the helical member;
outlet openings formed in the tubular member, said outlet openings comprising the outlet from the auger;
end caps closing the outwardly facing ends of the helical member and tubular member; and
a drive shaft attached to the end cap closing the outward end of the tubular member and extending outwardly therefrom in coaxial alignment with the tubular member.

20. Apparatus as claimed in claim 19 wherein:
a rotary coupling is mounted on the outside of filter chamber, said rotary coupling having an auger outlet therefrom;
the helical member lies wholly within the filter chamber;
the tubular member protrudes outwardly through the filter chamber and terminates within the rotary coupling, with the outlet openings being within the rotary coupling; and
the drive shaft extends outwardly through the rotary coupling into engagement with the drive means.

* * * * *